Figure 1:
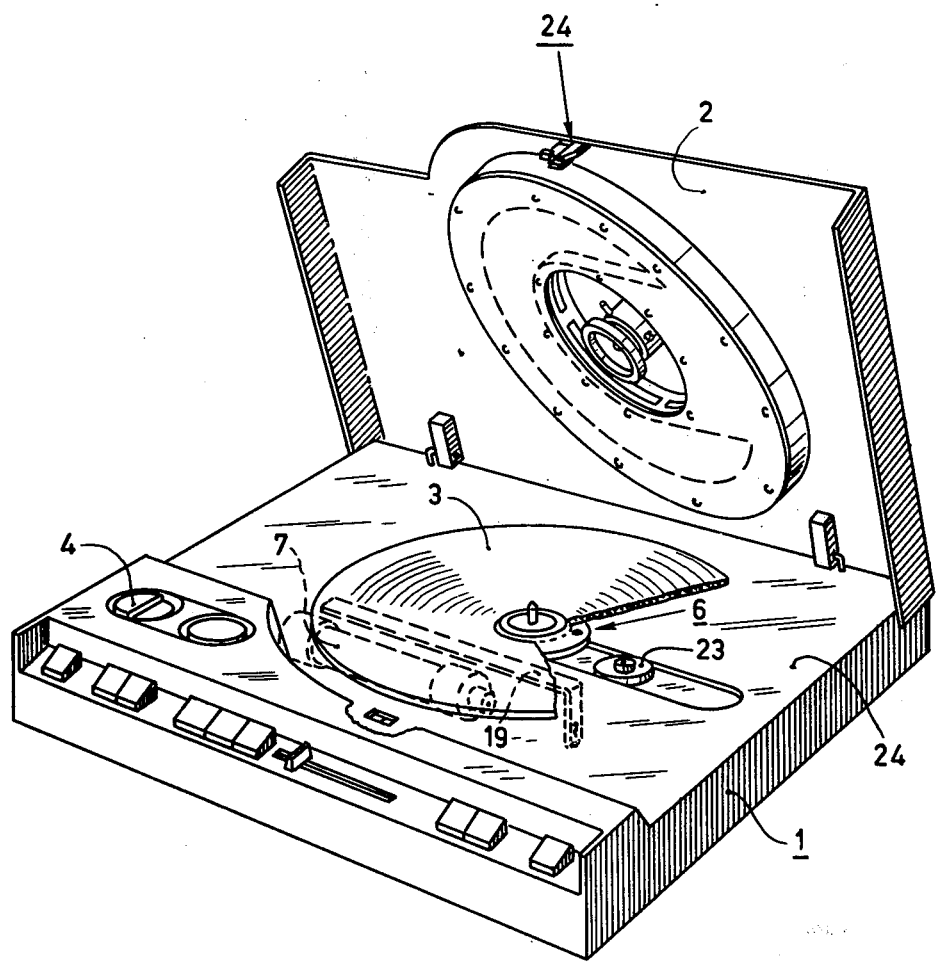

United States Patent [19]

Camerik

[11] 4,032,971

[45] June 28, 1977

[54] VIDEO PLAYER HAVING SAFETY DEVICES ACTUATED BY UNLATCHING

[75] Inventor: Eduard Camerik, Eindhoven, Netherlands

[73] Assignee: U.S. Philips Corporation, New York, N.Y.

[22] Filed: Nov. 3, 1975

[21] Appl. No.: 628,092

[30] Foreign Application Priority Data

Sept. 11, 1975 Netherlands .................. 7510688

[52] U.S. Cl. .................. 358/128; 179/100.3 V; 274/23 A; 274/39 A

[51] Int. Cl.² .................. H04N 5/76; G11B 17/00

[58] Field of Search ....... 178/6.7 A, 6.6 R, 6.6 DD; 179/100.3 V; 274/1 R, 1 G, 1 D, 2, 9 B, 23 A, 5 R, 9 R, 39 A; 360/86; 358/128

[56] References Cited

UNITED STATES PATENTS

| 3,930,653 | 1/1976 | Huff | 274/1 R |
|---|---|---|---|
| 3,940,148 | 2/1976 | Torrington et al. | 274/1 R |
| 3,954,272 | 5/1976 | Leedom | 274/23 A |

*Primary Examiner*—Raymond F. Cardillo, Jr.
*Attorney, Agent, or Firm*—Frank R. Trifari; Simon L. Cohen

[57] ABSTRACT pg,1 A video disc player provided with a housing and a latched hinged cover. By unlatching the cover the main motor power is switched off, a brake brings the drive spindle to a standstill, the radiation beam power is switched off, and a guard blocks the radiation beam path.

9 Claims, 2 Drawing Figures

VIDEO PLAYER HAVING SAFETY DEVICES ACTUATED BY UNLATCHING

The invention relates to a video player for playing back round video disks provided with information tracks which are readable with the aid of a beam of radiation, and comprising a housing and a cover which is movably connected to the housing and which in a playing position covers a video disk which is being played back, latching means for latching the cover in its playing position, unlatching means for unlatching the cover from its playing position, an electric motor (main motor) accommodated in the housing for rotating the video disk, a drive spindle which is coupled to the motor for the rotary support of a video disk, and a radiation source for producing said beam of radiation.

Video players for playing back video disks whose information tracks are read with the aid of a beam of radiation, more in particular with the aid of a light beam, are known from various publications, see for example the following articles: "The Philips VLP system", Philips Technical Review 33, 178-93, 1973, no. 7; "Ein neues Bildplattensystem mit transparanter Folie", Funkschau, Heft 20, 2286-2288, 1974, and "The MCA Disco-Vision System", Journal of the SMPTE, volume 83, July 1974. During use of the video player the video disc is placed on the drive spindle and during playing it is rotated thereby with a speed of 1500 or 1800 revolutions per minute, depending on the local line frequency, which is 50 or 60 Hz. The radiation source produces a beam of radiation which is projected on the tracks of the video disk and is modulated by the information contained on said disk. The modulated beam is passed, either after reflection or after having traversed the disk to electronic means for converting and processing the radiation beam modulation. The information on the disk is generally contained in tracks of extremely small dimensions. This is necessary in view of the very high information density which is required for composing a television picture, in particular a color television picture, with the associated sound. Every revolution, the track on the disk contains the complete information necessary for the formation of a single television picture. For scanning and reading said track a very narrowly focussed radiation beam is required of comparatively high intensity.

Both the high speed of the drive spindle and the use of a radiation beam of high intensity involve certain risks to the user of the apparatus. Consequently, it is important that during use the apparatus is covered by a cover. It is an object of the invention to make video players of the type mentioned in the preamble still safer for the user and the invention is characterized in that the unlatching means for the cover, during unlatching, co-operate with at least one of the following safety means:

a. switching means for switching off the main motor,
b. brake means for braking and bringing the drive spindle to a standstill,
c. switching means for extinguishing the radiation beam,
d. guard means which are positioned in the radiation path of the radiation beam for masking off the radiation beam before it can emerge from the housing.

In the scope of the present Application safety means is to be understood to mean not only the means which specifically serve to protect the user of the player, but also a means which serves to prevent the occurrence of certain undesired situations when the cover of the player is unlatched. The safety means will now be discussed in the above sequence.

It is evident that before a video disk can be taken off the drive spindle, the drive spindle should first be stationary, at least substantially stationary. The motor should therefore be switched off, while moreover the drive spindle must be braked from a speed of 1800 or 1500 revolutions per minute down to substantially standstill. In this respect it is of great advantage if, as is the object of the invention, the motor for driving the drive spindle is already switched off by the operation of unlatching the cover. However, in view of the high speed of the video disk it is still possible that during further opening of the cover a situation may arise which is dangerous for the user, even when the motor is switched off. Touching the rapidly rotating video disk could result in injury of the hand of the user, while moreover it is not unlikely that the video disk with its high speed jumps off the drive spindle and might consequently hurt the user or the player, or other objects in the vicinity. Therefore, it is a major advantage that in the video player according to the invention the drive spindle is automatically braked down to standstill when the cover is unlatched. The automatic extinction of the radiation source is also important for the safety of the user. When the disc is taken off, in particular with video players which use a reflected beam of radiation, the radiation beam from the objective might hit the user's eye. In the video player according to the invention the radiation beam is extinguished fully automatically, so that the user cannot forget this. Moreover, the video player according to the invention is provided with an extra safety means to prevent the radiation beam from emerging, which is of special importance in the event of failure of the previously mentioned safety means for the extinction of the radiation source. In that case the radiation beam is interrupted by the guard means, so that there is neither any risk for the user in this extreme situation.

The video players described in the previously cited articles are all provided with a laser for producing a coherent light beam. They comprise directing means in the form of an objective for directing the light beam to the video disk, which objective is mounted on a support or carriage which is radially movable relative to the drive spindle. By means of an electric auxiliary motor said carriage can be moved to and fro, so that during playing the objective can continue to follow the substantially spiral-shaped information track on the video disk with its light beam. In these and similar video players an embodiment of the invention may be utilized which is characterized in that the said safety means also include interrruption means for prevening an electric current being supplied to the auxiliary motor for driving the carriage. Thus, when the video disk is removed the carriage is prevented from moving towards one of its extreme positions. In some known video players the objective for directing the beam of radiation to the video disk is provided with an objective motor for moving the objective towards and away from the video disk, so as to obtain a correct focussing. In such a video player it is advantageous to utilize an embodiment of the invention in which the safety means also includes interruption means for preventing an electric current from being applied to the objective motor. The advantage of this embodiment of the invention is that with the video disk removed the objective motor will not move the objective to its uppermost position, but in the absence of an energizing current and under the influence of the force of gravity it moves in fact to its lowermost position and remains there.

In one embodiment of the invention the said brake means for braking and bringing the drive spindle to a standstill comprise a brake lever which is hingedly connected to the housing and which co-operates with the cover of the video player, a brake disk on the drive spindle, a brake band which at one of its ends is connected to the housing and with its other end to the brake lever, while in a braking position of the brake lever the brake band c-operates with a part of the circumference of the brake disk and in an operating position the brake band leaves the brake disk entirely free, as well as resilient means which constantly load the brake lever in a direcion towards the braking position.

It is also advantageous to use an embodiment which is characterized in that the said guard means for the radiation beam comprise a guard lever which is hingedly connected to the housing and which co-operates with the cover of the video player, and a vane which is connected to the guard lever, which vane in a guard position of the guard lever is disposed in the radiation path of the radiation beam and interrupts said beam, if present, and in an operating position does not impede the radiation beam. In yet another embodiment the brake lever and the guard lever may co-operate with each other, only one of said levers co-operating directly with the cover. The means for latching the cover may then comprise a latching hook which is connected to the cover, which hook has a free end and an at least partly oblique side face which co-operates with the brake lever, the brake lever being pressed against said side face by said associated resilient means and thus being kept out of the braking position in the closed position of the cover.

A further embodiment has the advantage that the brake lever and, as the case may be, the guard lever which is connected thereto, cannot be inadvertently actuated by the hand of the user when the cover is open, and is characterized in that the housing is provided with a leaf spring which presses against the free end of the latching hook in the closed position of the cover, which spring when the cover is open co-operates with the brake lever and blocks it in the braking position.

The drive spindle requires a certain time to come to a complete standstill. Therefore the following embodiment of the invention is of practical importance, which embodiment is characterized in that the unlatching means includes a delay mechanism which after the actuation of the unlatching means by the user of the video player only allows the cover to be opened completely after a certain time has elapsed which suffices to allow the drive spindle to be brought to a substantially complete standstill by the brake means.

Figure 2:
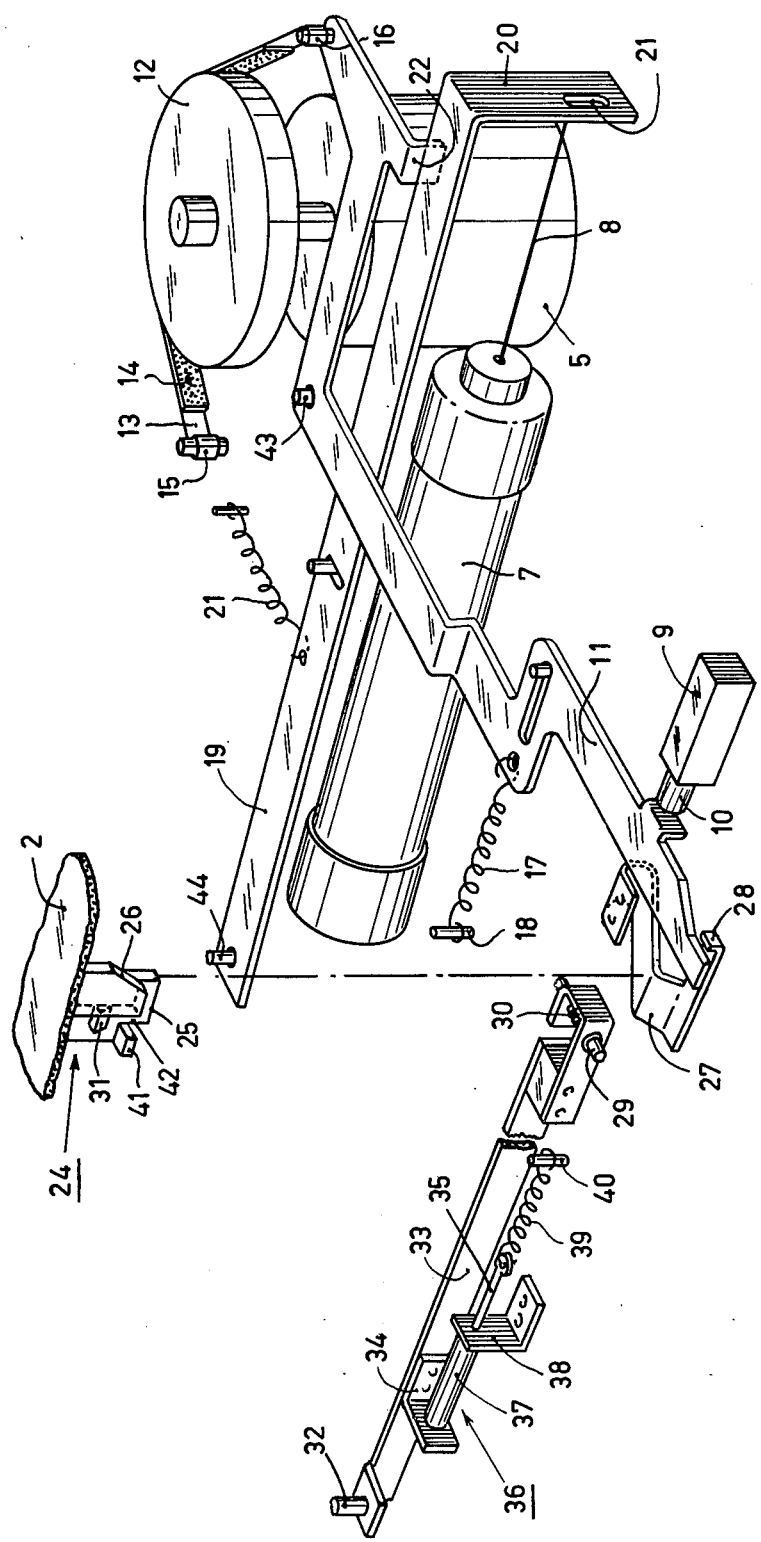

The invention will now be described in more detail with reference to the drawing, in which FIG. 1 is a perspective view of a video-player with open cover, and FIG. 2 is a perspective view which shows a number of components of the video player of FIG. 1, which player comprises a latching hook which is connected to the cover of the player as well as unlatching and safety means co-operating therewith.

The video player shown in FIG. 1 is of the type in which optical information contained on a video disk is read out by reflection with the aid of a laser beam. The player comprises a housing 1 on which a cover 2 is mounted which is hingedly connected to the housing. On the player a video disk 3 is placed which in the playing position, i.e. when the video disk is played back, covers said player. In the playing position the cover is latched by a number of latching means to be discussed hereinafter, which can be unlatched by means of the manually actuated slide button 4 as well as a number of unlatching means also to be discussed hereinafter. The housing accommodates a motor 5, see FIG. 2, for rotating the video disk. Said motor, to be referred to as main motor, is coupled to a drive spindle 6 for the rotary support of the video disk. Furthermore, the housing 1 accommodates a radiation source in the form of a laser 7, which is schematically shown in the Figures and which may for example consist of a helium-neon laser. In FIG. 2 the beam of radiation produced by the laser is denoted by the reference numeral 8.

During unlatching the unlatching means to be discussed co-operate with a number of safety means. Said means comprise;

a. Switching means in the form of a switch 9 with several switching contacts for switching off the main motor 5. In FIG. 2 the electrical connection between the electrical mains and the switch 9 and the main motor 5 has been left out for clarity. At least one of the switching contacts of the switch 9, however, is included in the supply circuit of the main motor, so that by the actuation of the switch 9, which is provided with a push-button 10, the power supply to the main motor is switched off.

b. Brake means for braking and bringing the drive spindle 6 to a standstill and comprising: a brake lever 11 which is hingedly connected to the housing, a brake disk 12 on the drive spindle, as well as a brake band 13 which is provided with a brake lining 14 and which is connected to the housing at one of its ends 15 and to the brake lever 11 at its other end 16. As will appear hereinafter when the operation of the various safety means is described, the brake band 13 co-operates with a part of the circumference of the brake disk 12 when the cover is open, but leaves said disk completely free in the operating position. The brake means also includes a tension spring 17, which at one side is connected to the brake lever 11 and at the other side is rigidly connected to the housing via a pin 18. Said spring constantly loads the brake lever in a direction towards the braking position.

c. Switching means for extinguishing the radiation source, also comprising at least one switching contact of the switch 9. The electrical connections between the electric mains and the laser are not shown.

d. Guard means which enter into the radiation path of the radiation beam 8 for masking off said radiation beam before it can emerge from the housing 1. Said guard means comprises a guard lever 19 which is hingedly connected to the housing and a vane 20 connected to said lever, which vane in the guard position of the guard lever 11 is disposed in the path of the radiation beam 8 and masks off said beam, if present, but in the operating position leaves the radiation beam fully unimpeded by means of the opening 21 formed in the vane. Furthermore, the guard means includes a tension spring 21 which continuously loads the guard lever 19 in a direction towards the bent tab 22 of the brake lever 11. As a result the brake lever 11 and the guard lever 19 are constantly in contact with each other and co-operate with each other, the brake lever 11 moreover co-operating with the cover 2 of the video player in a manner to be discussed hereinafter.

The video player of FIG. 1 is equipped with directing means 23 for directing a read beam to the information tracks of the video disk 3. These directing means comprise an objective belonging to a focussing device, which objective is provided with a number of optical elements for focussing the light beam on the information track and for receiving the reflected light beam. A suitable focussing device is for example described in the Applicant's pending U.S. application Ser. No 568,623, filed Apr. 16, 1975, incorporated by reference. Said focussing device is disposed on the carriage underneath the deck 24 of the video player, which carriage is radially movable relative to the drive spindle. Said carriage is not shown and can also be driven in its direction of movement by means of an electric auxiliary motor, not shown. In order to avoid damage to the video player when removing a video disk, a further safety means is provided, namely:

e. Interruption means, comprisin at least one switching contact on the switch 9, for preventing an electric current being applied to said auxiliary motor.

Furthermore, in order to prevent damage to the focussing device and in particular to the objective, the following safety means are provided:

f. Interruption means, also comprising at least one switching contact on the switch 9, for preventing an electric current being supplied to the objective motor.

Both the auxiliary motor for the carriage and the objective motor are motors which are supplied via a servo system. Consequently, they are included in a control circuit, i.e. the auxiliary motor in a control circuit for the radial tracking of the spiral track on the video disk and the objective motor for following the axial movements of the disk with the objective. The removal of the video disk results in said control circuit continuously receiving an error signal, as a result of which the auxiliary motor will bring the carriage into one of its extreme positions, while the objective motor will move the objective to its uppermost position. Thus, there is a risk of the objective being damaged, for example owing to maneuvres with the next disk to be played, whilst it is also undesirable that the carriage is continuously kept in the extreme position, because the motor would constantly remain energized with the maximum voltage during standstill.

The latching and unlatching means will now be discussed hereinafter.

The latching means comprise a latching hook 24 which is connected to the cover 2. Said latching hook has a fairly complicated shape and is best visible in FIG. 2. It has a free end 25 and, adjoining said end, an at least partly oblique side face 26 which co-operates with the brake lever 11. In the closed position of the cover the brake lever 11 presses against the side face 26 under the influence of the tension spring 17 and is thus kept out of the braking position. In the closed position of the cover the free end 25 of the latching hook co-operates with a leaf spring which has the reference numeral 27. Said leaf spring is connected to the housing 1 and continuously presses against the free end 25 in the closed position. Also connected to the leaf spring 27 is a hook-shaped member 28. When the cover is open, i.e. in the situation shown in FIG. 2, the hook-shaped portion 28 blocks the brake lever 11. The latching means further comprise a pin 29 which can be moved on the latching hook 24 against the force of a pressure spring 30 by means of a ramp 31. The unlatching means comprise the unlatching button 4, which is visible in FIG. 1, and which can be moved to the left by the user so as to unlock the cover 2. The button 4 co-operates with a pin 32 which is fitted on an unlatching slide 33, which also carries said pin 29. By means of a bracket 34 the unlatching slide 33 is connected to the plunger 35 of a delay mechanism which bears the general reference numeral 36. The plunger is axially movable in a cylinder 37, which by means of a second bracket 38 is rigidly connected to the housing 1. The plunger 35 is continuously loaded by means of a tension spring 39, which via a pin 40 is also connected to the housing 1. Consequently, the unlatching slide 33 is also constantly loaded in a direction towards the right by the tension spring 39 in FIG. 2. Consequently, the force of said spring must be overcome by means of the manually actuated button 4.

The operation of the latching means, the unlatching means, as well as the safety means is as follows. Unlatching is effected by the user of the video player by manually moving the button 4 to the left. As a result the unlatching slide 33 is also moved to the left, so that the end of the pin slides off the top of the ramp 31. The leaf spring 27 presses the cover 2 upwards. However, the latching hook 24 is provided with a safety cam 41 which prevents the cover 2 from being opened further, because in the position of the unlatching slide 33 in which it is moved to the left, the pin 30 butts against the top of the cam 41. That is, since ramp 31 extends to a position directly over the right hand portion of cam 41, movement of pin 30 to the left across the top surface of ramp 31 ultimately causes the pin 30 to disengage from ramp 31 and to engage the rising upper surface of cam 41. The delay mechanism 36, which in addition to the plunger and the spring 35 also includes a certain quantity of grease accommodated in the cylinder 37, prevents the unlatching slide 33 from being moved to the right in a manner other than very slowly only. The time which is required to slide the unlatching slide so far back to the right that the end of the pin 30 no longer butts against the cam 41, but has engaged with the slot 42 of the latching hook 24, has been selected so that in the meantime the brake means are allowed to brake down the motor 5 substantially completely. Only when the unlatching slide 33 has been fully returned to the right, the cover 2 can be opened completely. The initial travel of the cover 2 immediately after the actuation of the unlatching button 4, which initial travel equals the distance between the cams 31 and 41, suffices to ensure that the brake lever 11 no longer co-operates with the side face 26 of the unlatching hook 24. Thus, immediately after the actuation of the unlatching button 4, which actuation is preferably unhampered by the delay means 36 by using a delay means of the well known type such as a single action shock absorber having a delay action which depends on the direction of movement, the tension spring 17 can allow the brake lever to rotate about its hinge pin 43. Owing to this rotation the end 16 of the brake band 13 is moved over such a distance that the brake lining 14 comes into contact with the brake disk 12. However, during the movement of the brake lever 11 the button 10 of the switch 9 has also been moved outwards, so that the switching contacts on the switch 9 have already changed over.

The main motor 5 is consequently switched off, while simultaneously the laser beam 8 is extinguished and the auxiliary motor of the carriage as well as the objective motor of the focussing device have been switched off. As an additional safety measure to the tab 22 also rotates the guard lever 19 about its pivot 44 upon rotation of the brake lever 11, so that a solid portion of the vane 20 enters the path of the laser beam 8.

What is claimed is:

1. A video player for playing back round video disks provided with information tracks which are readable with the aid of a radiation beam, of the type comprising:
    a housing,
    a cover which is movably connected to the housing and in a playing position covers a video disc which is being played,
    latching means for latching the cover in its playing position,
    unlatching means for unlatching the cover from its playing position,
    a main motor accommodated in the housing for rotating the video disk,
    a drive spindle coupled to the main motor for the rotary support of a video disk, and
    a radiation source for producing said radiation beam,
    first switching means for switching off the main motor,
    brake means for braking and bringing the drive spindle to a standstill,
    second switching means for extinguishing the radiation beam,
    guard means which enter the path of the radiation beam for masking off the radiation beam before it can emerge from the housing and wherein said unlatching means is operatively coupled to at least one of said first and second switching means, said brake means and said guard means.

2. A video player as claimed in claim 1, wherein the guard means for the radiation beam comprise:
    a guard lever which is hingedly connected to the housing and is operatively coupled with the cover of the video player, and
    a vane which is connected to the guard lever, which vane is a guard position of the guard lever is disposed in the path of the radiation beam and, masks off the path of said beam, and in an operating position does not impede the radiation beam.

3. A video player as claimed in claim 1, wherein the unlatching means include a delay mechanism, which after actuation of the unlatching means by a user of the video player only allows the cover to be opened completely after a certain time has elapsed which suffices to allow the drive spindle to be brought to a substantially complete standstill by the brake means.

4. A video player as claimed in claim 1 and comprising:
    directing means for directing the read beam to the information track,
    a carrier for the directing means which is radially movable relative to the drive spindle and
    an electric auxiliary motor for driving the carrier in its direction of movement,
    and interruption means for preventing an electric current being supplied to said auxiliary motor, said unlatching means being operatively coupled to said interruption means.

5. A video player as claimed in claim 4, the directing means consisting of an objective which comprises a focussing device and an electric objective motor, for moving the objective towards and away from the video disk, and interruption means for preventing an electric current being applied to the objective motor, wherein said unlatching means is operatively coupled to said objective motor.

6. A video player as claimed in claim 1, wherein the brake means for braking and bringing the drive spindle to a standstill comprise:
    a brake lever which is hingedly connected to the housing and which is operatively coupled with the cover of the video player,
    a brake disk on the drive spindle,
    a brake band which at one of its ends is connected to the housing and at its other end to the brake lever, the brake band co-operating with a part of the circumference of the brake disk in a braking position of the brake lever and the brake band leaving the brake disk completely free in an operating position, as well as
    resilient means for continuously biasing the brake lever in a direction towards the braking position.

7. A video player as claimed in claims 6 wherein the brake lever and the guard lever are operatively coupled with each other and wherein only one of said levers directly co-operates with the cover.

8. A video player as claimed in claim 6, wherein the latching means of the cover comprise a latching hook which is connected to the cover, said hook having a free end and an at least partly oblique side face is operatively coupled with the brake lever, the brake lever being pressed against said side face by said associated resilient means and thus being kept out of the braking position in the closed position of the cover.

9. A video player as claimed in claim 8, wherein said housing is provided with a leaf spring which in the closed position of the cover presses against the free end of the latching hook, which leaf spring when the cover is open co-operates with the brake lever and blocks it in the braking position.

* * * * *

UNITED STATES PATENT AND TRADEMARK OFFICE
CERTIFICATE OF CORRECTION

PATENT NO. : 4,032,971
DATED : June 28, 1977
INVENTOR(S) : EDUARD CAMERIK

It is certified that error appears in the above-identified patent and that said Letters Patent are hereby corrected as shown below:

In the Abstract, line 1, delete "pg,1";

Col. 5, line 15, after "1975," should be --hereby--;

line 24, "comprisin" should be --comprising--;

line 47, "whilst" should be --while--;

Col. 7, line 5, after "to" should be --prevent laser radiation emerging from the objective in the absence of the video disk and when the cover is open,--;

Claim 7, line 1, "claims" should be --claim--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks